(12) United States Patent
Lee et al.

(10) Patent No.: US 11,461,068 B2
(45) Date of Patent: Oct. 4, 2022

(54) DISPLAY DEVICE

(71) Applicant: LG ELECTRONICS INC., Seoul (KR)

(72) Inventors: Donghee Lee, Seoul (KR); Taeyoung Kim, Seoul (KR); Daegun Park, Seoul (KR); Hyosung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 16/989,725

(22) Filed: Aug. 10, 2020

(65) Prior Publication Data

US 2021/0303247 A1 Sep. 30, 2021

(30) Foreign Application Priority Data

Mar. 26, 2020 (KR) ........................ 10-2020-0037092

(51) Int. Cl.
*G06F 3/14* (2006.01)
*H04W 4/80* (2018.01)
(Continued)

(52) U.S. Cl.
CPC ............ *G06F 3/147* (2013.01); *G06F 3/1454* (2013.01); *H04W 4/023* (2013.01); *H04W 4/80* (2018.02);
(Continued)

(58) Field of Classification Search
CPC ...... G06F 3/1423; G06F 3/1454; G06F 3/147; G06N 3/08; G09G 2354/00; G09G 2370/16; H04M 1/72412; H04M 2250/16; H04N 21/4122; H04N 21/41407; H04N 21/42202; H04N 21/4223; H04N 21/43637; H04N 21/44008; H04N 21/44218; H04N 21/4432; H04N 21/4436; H04N 21/4666;
(Continued)

(56) References Cited

U.S. PATENT DOCUMENTS 9,711,142 B2 7/2017 Choi
9,973,618 B2 5/2018 Kang et al.
(Continued)

FOREIGN PATENT DOCUMENTS

CN 104423805 3/2015
CN 105530368 4/2016
(Continued)

OTHER PUBLICATIONS

European Patent Office Application Serial No. 20190459.6, Search Report dated Feb. 15, 2021, 8 pages.
(Continued)

*Primary Examiner* — Michael J Eurice
(74) *Attorney, Agent, or Firm* — Lee Hong Degerman Kang Waimey (57) ABSTRACT

A display device includes one or more sensors configured to obtain sensing data, a display, a communication interface configured to perform short-range wireless communication with a mobile terminal, and a processor configured to detect proximity of an object based on the obtained sensing data, perform automatic connection with the mobile terminal when the proximity of the object is detected, and display, on the display, information received from the connected mobile terminal.

10 Claims, 9 Drawing Sheets

(51) Int. Cl.
*G06F 3/147* (2006.01)
*H04W 76/14* (2018.01)
*H04W 4/02* (2018.01)
*H04R 1/08* (2006.01)

(52) U.S. Cl.
CPC .............. *H04W 76/14* (2018.02); *H04R 1/08* (2013.01); *H04R 2499/15* (2013.01)

(58) Field of Classification Search
CPC ..... H04R 1/08; H04R 2499/15; H04W 4/023; H04W 4/80; H04W 76/14
See application file for complete search history.

(56) References Cited

U.S. PATENT DOCUMENTS

| | | | |
|---|---|---|---|
| 10,001,869 B2 | 6/2018 | Yim et al. | |
| 10,432,909 B2 | 10/2019 | Lee et al. | |
| 10,489,100 B2 | 11/2019 | Jaegal et al. | |
| 10,672,317 B2 | 6/2020 | Lee et al. | |
| 2012/0099566 A1 | 4/2012 | Laine et al. | |
| 2015/0056920 A1* | 2/2015 | Huttunen | H04B 7/26 455/41.2 |
| 2015/0061968 A1 | 3/2015 | Park et al. | |
| 2015/0278498 A1* | 10/2015 | Hong | G06F 21/32 340/5.82 |
| 2017/0244827 A1* | 8/2017 | Kang | H04M 1/72454 |
| 2019/0094140 A1* | 3/2019 | Han | G01N 15/0205 |
| 2019/0361694 A1* | 11/2019 | Gordon | G06F 3/04883 |

FOREIGN PATENT DOCUMENTS

| | | |
|---|---|---|
| CN | 106375546 | 2/2017 |
| KR | 2020100013074 | 12/2010 |
| KR | 1020160031724 | 3/2016 |
| KR | 1020160133176 | 11/2016 |
| KR | 101730315 | 4/2017 |
| KR | 1020170098111 | 8/2017 |
| KR | 1020180064723 | 6/2018 |
| KR | 1020190090899 | 8/2019 |

OTHER PUBLICATIONS

Korean Intellectual Property Office Application No. 10-2020-0037092, Office Action dated Apr. 29, 2021, 7 pages.
The State Intellectual Property Office of the People's Republic of China Application Serial No. 202011417891.2, Office Action dated Feb. 23, 2022, 9 pages.
The State Intellectual Property Office of the People's Republic of China Application Serial No. 202011417891.2, Office Action dated Jul. 27, 2022, 9 pages.

* cited by examiner

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2020-0037092, filed on Mar. 26, 2020, the contents of which are all hereby incorporated by reference herein in its entirety.

BACKGROUND

The present disclosure relates to a display device, and more particularly, to a display device capable of detecting a proximity of a user.

The functions of terminals are diversifying. For example, there are functions for data and voice communication, photographing and video shooting through cameras, voice recording, music file playback through speaker systems, and output of images or video to displays.

Some terminals may additionally have an electronic game play function or may execute a multimedia player function.

As such functions become more diversified, the terminals are embodied in the form of a multimedia player that can support complicated functions such as capturing images or video, playing back music or video files, playing games, receiving broadcast signals, and the like.

A terminal such as a conventional TV also has a function of detecting a proximity of a user through a sensor and outputting a message welcoming home coming.

However, an existing sensor recognizes the movement of pets or even the movement of another user, thus causing a reduction in reliability.

In addition, a conventional terminal interworks with a mobile terminal such as a user's smartphone according to the detection of the proximity of the user, but after interworking, only limited functions have been provided.

SUMMARY

The present disclosure provides a display device capable of reliably detecting the proximity of a user.

The present disclosure provides a display device capable of activating an always on display (AOD) function of a display after automatic connection with an external device.

The present disclosure provides a display device capable of interworking with different types of information according to a screen state of an external device after automatic connection with the external device.

According to an embodiment of the present disclosure, a display device may include one or more sensors configured to obtain sensing data, a display, a communication interface configured to perform short-range wireless communication with a mobile terminal, and a processor configured to detect proximity of an object based on the obtained sensing data, perform automatic connection with the mobile terminal when the proximity of the object is detected, and display, on the display, information received from the connected mobile terminal.

According to an embodiment of the present disclosure, a display device may include one or more sensors configured to obtain sensing data, a display, a communication interface configured to perform short-range wireless communication with a mobile terminal, and a processor configured to detect proximity of an object based on the obtained sensing data, perform automatic connection with the mobile terminal when the proximity of the object is detected, and display, on the display, different types of information based on a screen state of the mobile terminal.

The details of one or more embodiments are set forth in the accompanying drawings and the description below. Other features will be apparent from the description and drawings, and from the claims.

DETAILED DESCRIPTION OF THE EMBODIMENTS

Figure 1:
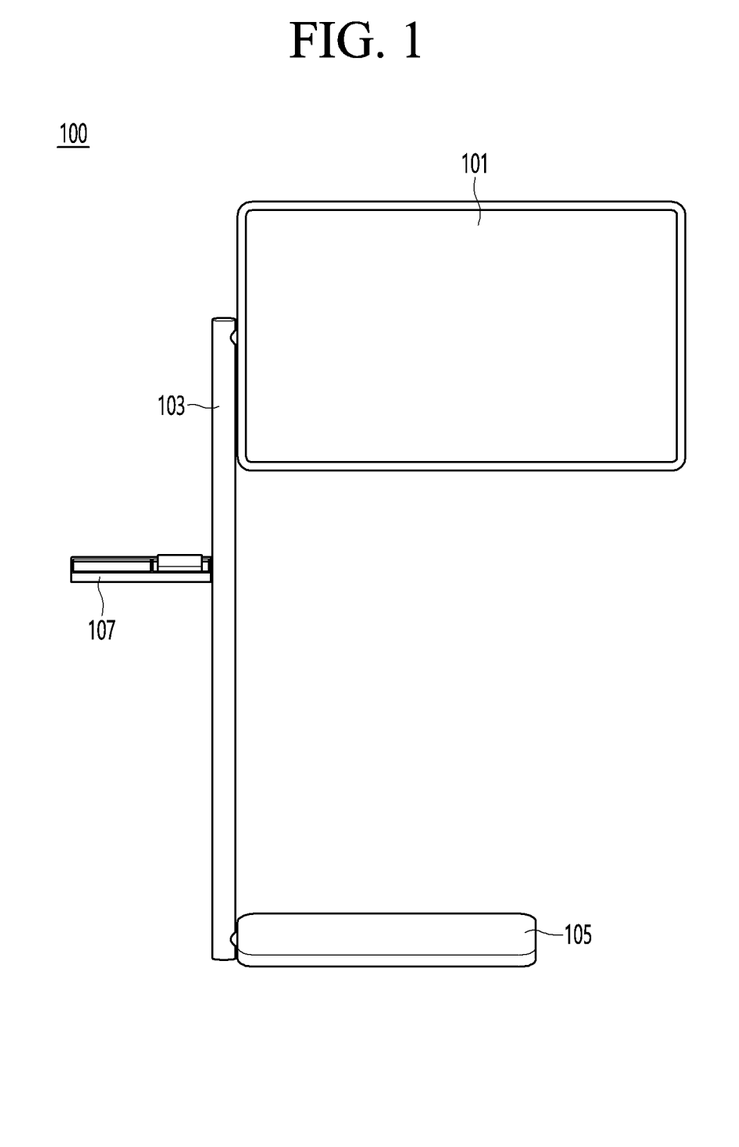
FIG. 1 is a diagram illustrating a configuration of a display device according to an embodiment of the present disclosure.

FIG. 1 is a diagram illustrating a configuration of a display device according to an embodiment of the present disclosure.

A display device 100 may be implemented as a TV, a mobile phone, a smartphone, a desktop computer, a laptop, a digital broadcasting terminal, a personal digital assistant (PDA), a portable multimedia player (PMP), a navigation, a tablet PC, a wearable device, a desktop computer, a digital signage, and the like.

The display device 100 of FIG. 1 may be a device that can be moved by a user. To this end, a stand base 105 of the display device 100 to be described below may be provided with wheels so as to facilitate movement.

Referring to FIG. 1, the display device 100 according to the embodiment of the present disclosure may include a head 101, a shaft 103, a stand base 105, and a holder 107.

The head 101 may be spaced above the stand base 105.

The head 101 may include a display 151 and a back cover 151a surrounding the outer periphery of the display 151.

The shaft 103 may connect the head 101 to the stand base 105. The shaft 103 may extend vertically. The lower end of the shaft 103 may be connected to the edge of the stand base 105. In more detail, the lower end of the shaft 103 may be rotatably connected to the circumference of the stand base 105. Therefore, the head 101 and the shaft 103 may rotate about a vertical axis with respect to the stand base 105.

The upper portion of the shaft 103 may be connected to the circumference of the head 101. The upper portion of the shaft 103 may face the circumference of the head 101 in a horizontal direction.

In more detail, a connecting pin protruding horizontally may be formed at the upper portion of the shaft 103, and the connecting pin may be connected to the circumference of the head 101. The head 101 may be tilted around the horizontal axis corresponding to the connecting pin.

The stand base 105 may serve to support the display device 100.

The holder 107 may be a part capable of holding a user's belongings such as a user's smartphone or a cup.

The holder 107 may be connected to one point of the shaft 103. The holder 107 may be disposed horizontally.

A height from the stand base 105 to the holder 107 may be lower than a height from the stand base 105 to the head 101.

The holder 107 may be located at the opposite side of the head 101 with respect to the shaft 103. In more detail, the head 101 may be connected to one side of the shaft 103, and the holder 107 may be connected to the other side of the shaft 103. Therefore, the user may easily hold the belongings on the holder 107 without being disturbed by the head 101.

Figure 2:
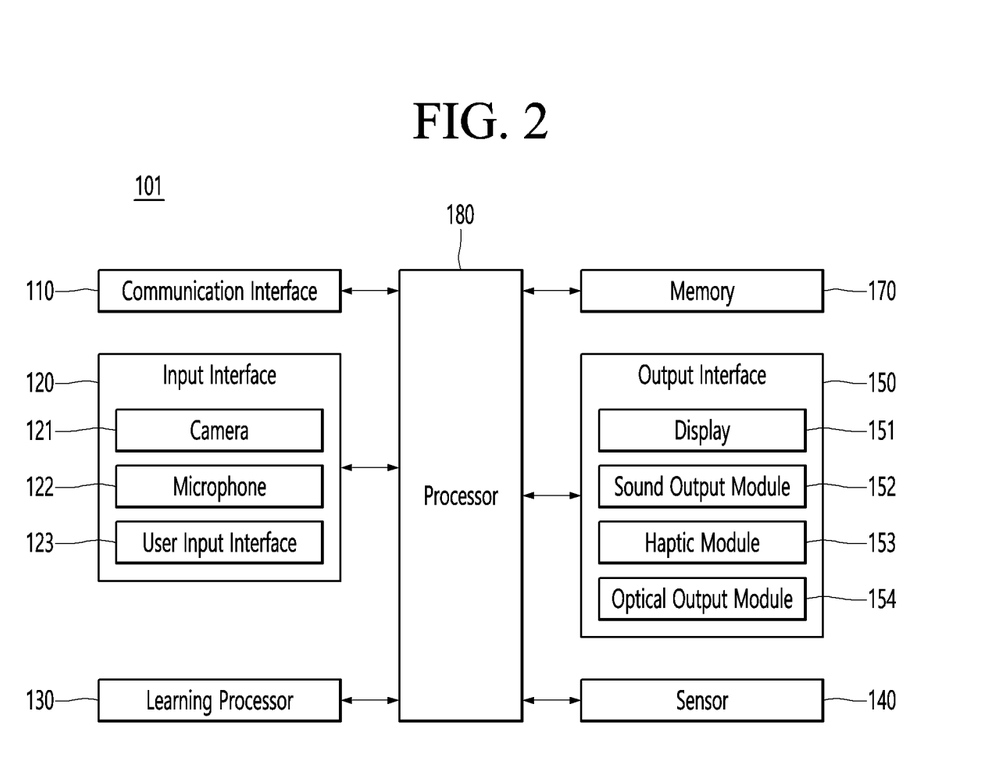
FIG. 2 is a block diagram illustrating a configuration of a display device according to an embodiment of the present disclosure.

FIG. 2 is a block diagram for describing components of the display device according to an embodiment of the present disclosure.

In particular, the components of FIG. 2 may be provided in the head 101 of FIG. 1.

Referring to FIG. 2, the display device 100 may include a communication interface 110, an input interface 120, a learning processor 130, a sensor 140, an output interface 150, a memory 170, and a processor 180.

The communication interface 110 may transmit or receive data to and from external devices such as another terminal or an external server by using wired/wireless communication technology. For example, the communication interface 110 may transmit or receive sensor information, a user input, a learning model, a control signal, and the like to and from the external devices.

The communication technology used by the communication interface 110 may include Global System for Mobile Communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like.

The input interface 120 may obtain various types of data.

The input interface 120 may include a camera for inputting a video signal, a microphone for receiving an audio signal, a user input interface for receiving information from a user, and the like. The camera or the microphone may be treated as a sensor, and the signal obtained from the camera or the microphone may be referred to as sensing data or sensor information.

The input interface 120 may obtain training data for model training and input data to be used when obtaining an output by using the learning model. The input interface 120 may obtain raw input data. In this case, the processor 180 or the learning processor 130 may extract an input feature as pre-processing for the input data.

The input interface 120 may include a camera 121 for inputting a video signal, a microphone 122 for receiving an audio signal, and a user input interface 123 for receiving information from a user.

The voice data or image data collected by the input interface 120 may be analyzed and processed by a user's control command.

The input interface 120 is provided for input of video information (or signals), audio information (or signals), data, or information input from a user. For the input of the video information, the display device 100 may include one or more cameras 121.

The camera 121 processes image frames of still pictures or video obtained by image sensors in a video call mode or an image capture mode. The processed image frame may be displayed on the display 151 or stored in the memory 170.

The microphone 122 may process external audio signals into electrical voice data. The processed voice data may be variously used according to a function (or a running application program) that is performed in the display device 100. Various noise cancellation algorithms may be applied to the microphone 122 so as to remove noise generated during the process of receiving an external sound signal.

The user input interface 123 is provided for receiving information from a user. When information is input through the user input interface 123, the processor 180 may control the operation of the display device 100 so as to correspond to the input information.

The user input interface 123 is a mechanical input interface (or a mechanical key, for example, a button located on the front, rear, or side of the terminal 200, a dome switch, a jog wheel, a jog switch, etc.) and a touch-type input interface. As an example, the touch-type input interface include a virtual key, a soft key, or a visual key displayed on a touch screen through software processing, or may include a touch key disposed at a part other than the touch screen.

The learning processor 130 may train a model including an artificial neural network by using training data. The trained artificial neural network may be referred to as a learning model. The learning model may be used to infer a result value for new input data other than training data, and the inferred value may be used as a basis for determining to perform an action.

In this case, the learning processor 130 may include a memory integrated or implemented in the display device 100. Alternatively, the learning processor 130 may be implemented by using the memory 170, an external memory directly connected to the display device 100, or a memory provided in the external device.

The sensor 140 may use various sensors to obtain at least one of internal information about the display device 100, ambient environment information about the display device 100, or user information.

In this case, the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and radar.

The output interface 150 may generate an output related to vision, hearing, or tactile sense.

In this case, the output interface 150 may include a display for outputting visual information, a speaker for outputting auditory information, a haptic module for outputting tactile information, and the like.

The output interface 150 may include at least one of a display 151, a sound output module 152, a haptic module 153, or an optical output module 154.

The display 151 displays (outputs) information processed by the display device 100. For example, the display 151 may display execution screen information of an application program driven by the display device 100, or user interface (UI) or graphic user interface (GUI) information according to the execution screen information.

The display 151 may form a mutual layer structure with the touch sensor or may be integrally formed with the touch sensor to implement a touch screen. The touch screen may function as a user input interface 123 that provides an input interface between the display device 100 and a user and also provide an output interface between the terminal 200 and the user.

The sound output module 152 may output audio data received from the communication interface 110 or stored in the memory 170 in a call signal reception mode, a call mode or a record mode, a voice recognition mode, and a broadcast reception mode.

The sound output module 152 may include at least one of a receiver, a speaker, or a buzzer.

The haptic module 153 generates various haptic effects that a user can feel. A typical example of the haptic effects generated by the haptic module 153 is vibration.

The optical output module 154 outputs a signal for notifying the occurrence of an event by using light emitted from the a source of the display device 100. Examples of the event generated in the display device 100 may include message reception, call signal reception, missed call, alarm, schedule notification, email reception, and information reception through applications.

The memory 170 may store data supporting various functions of the display device 100. For example, the memory 170 may store input data, training data, learning models, learning history, and the like, which are obtained by the input interface 120.

The processor 180 may determine at least one executable operation of the display device 100 based on information determined or generated by using a data analysis algorithm or a machine learning algorithm. The processor 180 may control components of the display device 100 to perform the determined operation.

To this end, the processor 180 may request, search, receive, or utilize data of the learning processor 130 or the memory 170 and may control the components of the display device 100 to perform a predicted operation or an operation determined to be preferable among the at least one executable operation.

When it is necessary to interwork with an external device so as to perform the determined operation, the processor 180 may generate a control signal for controlling the external device and transmit the generated control signal to the external device.

The processor 180 may obtain intention information for a user input and determine a user's requirements based on the obtained intention information.

In this case, the processor 180 may obtain intention information corresponding to the user input by using at least one of a speech to text (STT) engine for converting speech input into a text string or a natural language processing (NLP) engine for obtaining intention information of natural language.

In this case, at least one of the STT engine or the NLP engine may be configured as an artificial neural network, at least part of which is learned according to a machine learning algorithm. At least one of the STT engine or the NLP engine may be learned by the learning processor 130, may be learned by an external server, or may be learned by distributed processing thereof.

The processor 180 may collect history information including the operation of the display device 100 or the user's feedback on the operation and store the collected history information in the memory 170 or the learning processor 130 or may transmit the collected history information to the external device such as the external server. The collected history information may be used to update the learning model.

The processor 180 may control at least part of the components of the display device 100 so as to drive an application program stored in the memory 170. Furthermore, the processor 180 may operate the components of the display device 100 by combining two or more of the components so as to drive the application program.

Figure 3:
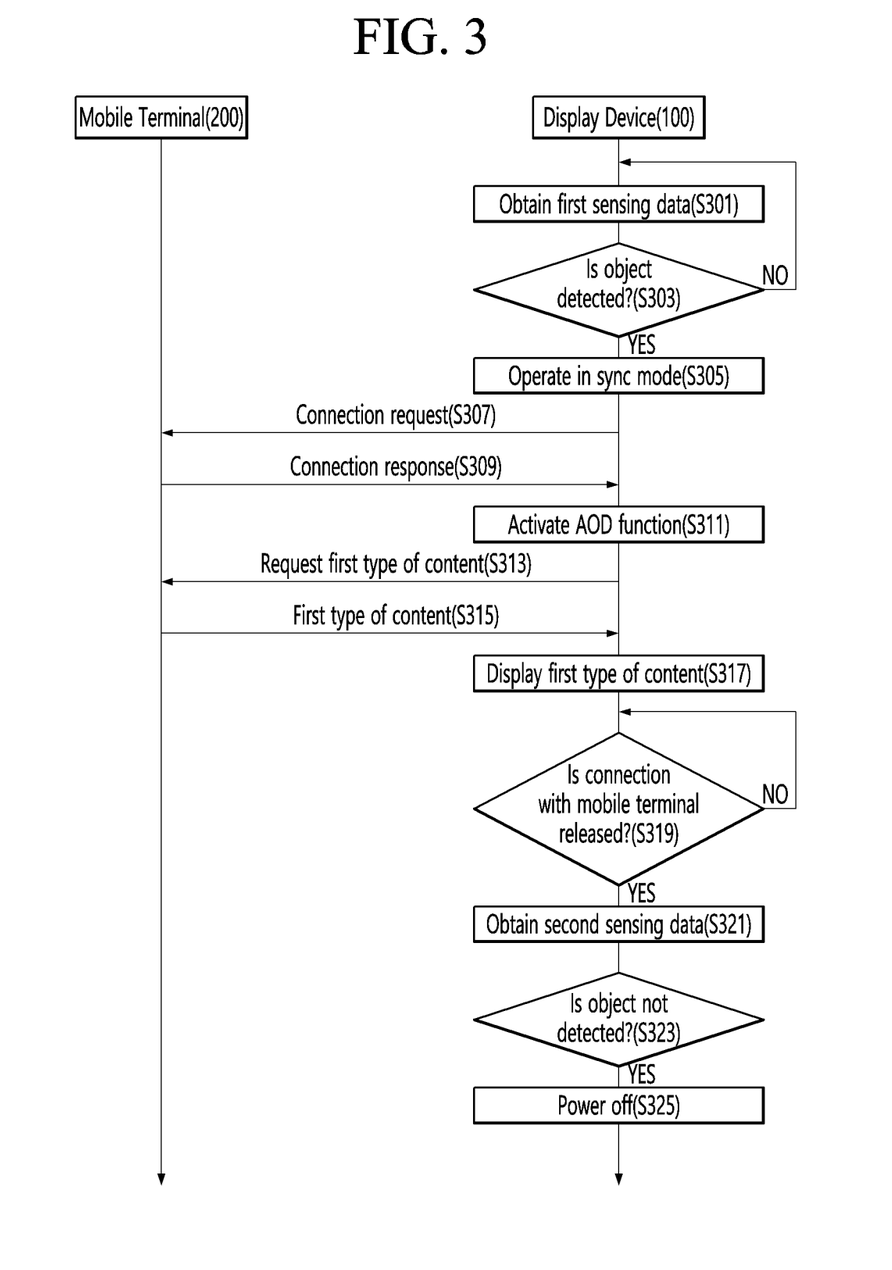
FIG. 3 is a diagram illustrating an operating method of a system according to an embodiment of the present disclosure.

FIG. 3 is a diagram illustrating an operating method of a system according to an embodiment of the present disclosure.

The system according to an embodiment of the present disclosure may include a display device 100 and a mobile terminal 200.

Hereinafter, a power mode of a display 151 may operate in one of a low power mode, an active standby mode, and an active mode.

The low power mode may be a mode in which only the minimum power required for the operation of the display 151 is supplied to the display 151. In the low power mode, the display 151 displays no information.

The active standby mode may be a mode for performing an AOD function of the display 151. The AOD function may be a function that always displays information on a screen even when the display 151 is turned off. In the active standby mode, the AOD function may be activated.

In the AOD function, the type of information displayed on the screen may be limited. That is, information having a small data capacity, such as weather, time, welcome message, notification message, and schedule information, may be displayed under the AOD function.

The active mode may be a mode in which the power of the display 151 is turned on to display information.

In the active standby mode, since the display 151 is turned off, the power consumption in the active standby mode is smaller than the power consumption in the active mode.

Referring to FIG. 3, the processor 180 of the display device 100 obtain first sensing data (S301).

The processor 180 may obtain motion data of an object by using a motion sensor included in the sensor 140. The motion data may be data used to detect the movement of the object.

The object may be a user or an animal.

As another example, the processor 180 may obtain voice data input through the microphone 122 as sensing data. The microphone 122 may be provided as a component of the sensor 140.

The first sensing data may be used to determine whether the object is in proximity to the display device 100.

At the time of obtaining the first sensing data, the display 151 may be operated in a low power mode.

The processor 180 may obtain motion data and voice data at regular intervals.

The processor 180 of the display device 100 determines whether the object is detected, based on the obtained first sensing data (S303).

In an embodiment, the processor 180 may determine that the object is detected when the movement of the object is detected based on the motion data.

In another embodiment, when it is determined that the voice data corresponds to a human voice, the processor 180 may determine that the object is detected, based on the voice data.

When it is determined that the proximity of the object is detected, the processor 180 of the display device 100 operates the communication interface 110 in a sync mode (S305).

In an embodiment, the sync mode may be a mode for outputting data transmitted from the external device.

For example, in the case of Bluetooth communication, a device that transmits data may be referred to as a source device and a device that receives and outputs data may be referred to as a sync device.

The sync device may output at least one of video data or audio data transmitted by the source device in real time.

The processor 180 may change an operation mode of a short-range wireless communication module provided in the communication interface 110 to the sync mode.

Meanwhile, when the proximity of the object is detected, the processor 180 may boot the display 151 in a state in which the screen is turned off.

The processor 180 of the display device 100 transmits a connection request to attempt to connect to the mobile terminal 200 that has been previously connected through the communication interface 110 (S307).

The processor 180 may transmit a connection request for a wireless connection to the previously connected mobile terminal 200 based on the connection history.

The connection history may include identification information of the mobile terminal 200 that has been connected through the short-range wireless communication module provided in the communication interface 110 of the display device 100. The history of the mobile terminal 200 may include at least one of a model name or a name of the mobile terminal 200.

The connection history may be stored in the memory 170 of the display device 100.

The processor 180 of the display device 100 receives a connection response in response to the connection request through the communication interface 110 (S309) and activates an AOD function of the display 151 (S311).

When the connection response is received from the mobile terminal 200, the processor 180 may determine that the connection with the mobile terminal 200 is successful and may activate the AOD function of the display 151.

The AOD function may be a function that always turns on the screen of the display 151 to display information.

The AOD function may be a function that always displays information on all or part of the screen of the display 151, and when information is displayed on a partial region, makes the remaining region black. The partial region may be a fixed region of the screen of the display 151, but need not be limited thereto.

The processor 180 of the display device 100 requests the mobile terminal 200 for a first type of content through the communication interface 110 (S313), and receives the first type of content in response to the request (S315).

The processor 180 may request the mobile terminal 200 to transmit the first type of content by activating the AOD function of the display 151.

The first type of content may be data having a size less than a predetermined capacity.

The first type of content may be one of schedule information of a user stored in the mobile terminal 200 and notification event information received by the mobile terminal 200.

In contrast, the second type of content may be data having a size equal to or greater than a preset capacity.

The processor 180 of the display device 100 displays the received first type of content on the display 151 in the AOD mode (S317).

For example, the processor 180 may display the first type of content received from the mobile terminal 200 on the fixed region of the screen of the display 151.

The first type of content may be any one of schedule information, alarm information, and notification event information of the user stored in the mobile terminal 200.

In another embodiment, the first type of content may be a welcome message welcoming the user's home coming.

Operations S313 to S317 may be omitted. In this case, the processor 180 may display information such as a date and time on the display 151.

As another example, the processor 180 may display, on the display 151, schedule information of the user stored in the display device 100.

Thereafter, the processor 180 of the display device 100 determines whether the connection with the mobile terminal 200 is released (S319).

The processor 180 may determine whether a wireless connection with the mobile terminal 200 is released by using the short-range wireless communication module provided in the communication interface 110.

The processor 180 may determine that the connection with the mobile terminal 200 is released when a wireless connection stop signal is received from the mobile terminal 200.

When the connection with the mobile terminal 200 is released, the processor 180 of the display device 100 obtains the second sensing data (S321).

When the wireless connection with the mobile terminal 200 is released, the processor 180 may obtain second sensing data so as to determine whether the user is in proximity.

The second sensing data is the same type of data as the first sensing data and may include at least one of motion data obtained through the motion sensor or voice data input through the microphone 122.

The processor 180 of the display device 100 determines whether the object is not detected, based on the obtained second sensing data (S323).

The processor 180 may determine whether the object is detected, based on the second sensing data.

When the object is not detected, the processor 180 of the display device 100 turns off the power of the display 151 (S325).

When it is determined that the object is not detected, the processor 180 may deactivate the AOD function of the display 151 and turn off the screen of the display 151.

When the connection with the mobile terminal 200 is released, the processor 180 may re-detect the proximity of the object, and when the object is not detected, the display 151 may be operated in a low power mode.

According to an embodiment of the present disclosure, the proximity of the user's mobile terminal 200 is detected, and the operation mode of the display device 100 may be automatically switched, which has not been previously provided.

Therefore, the operation mode of the display device 100 is switched without a user's separate operation, thereby improving convenience.

In addition, according to an embodiment of the present disclosure, the power mode of the display device 100 is changed according to whether the user comes home, thereby optimizing power efficiency.

Furthermore, the reliability of the microphone and the motion sensor that detect the proximity of the user may be improved.

Figure 4:
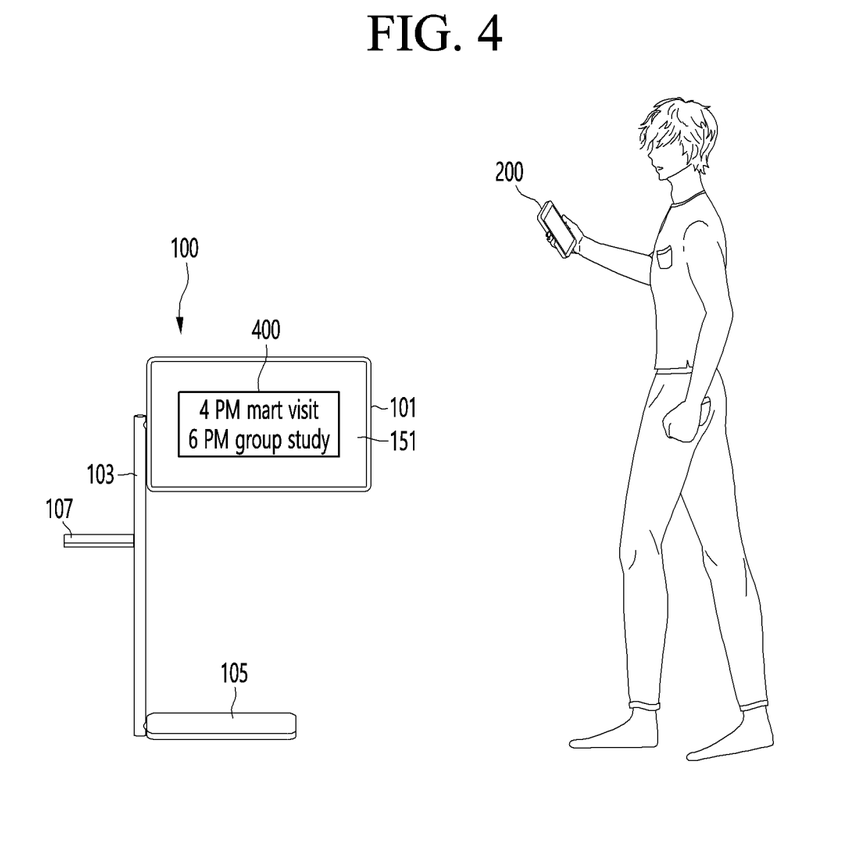
FIGS. 4 to 6 are diagrams illustrating an example of displaying information through automatic interworking with a mobile terminal when a display device detects a proximity of a user, according to an embodiment of the present disclosure.
Figure 5:
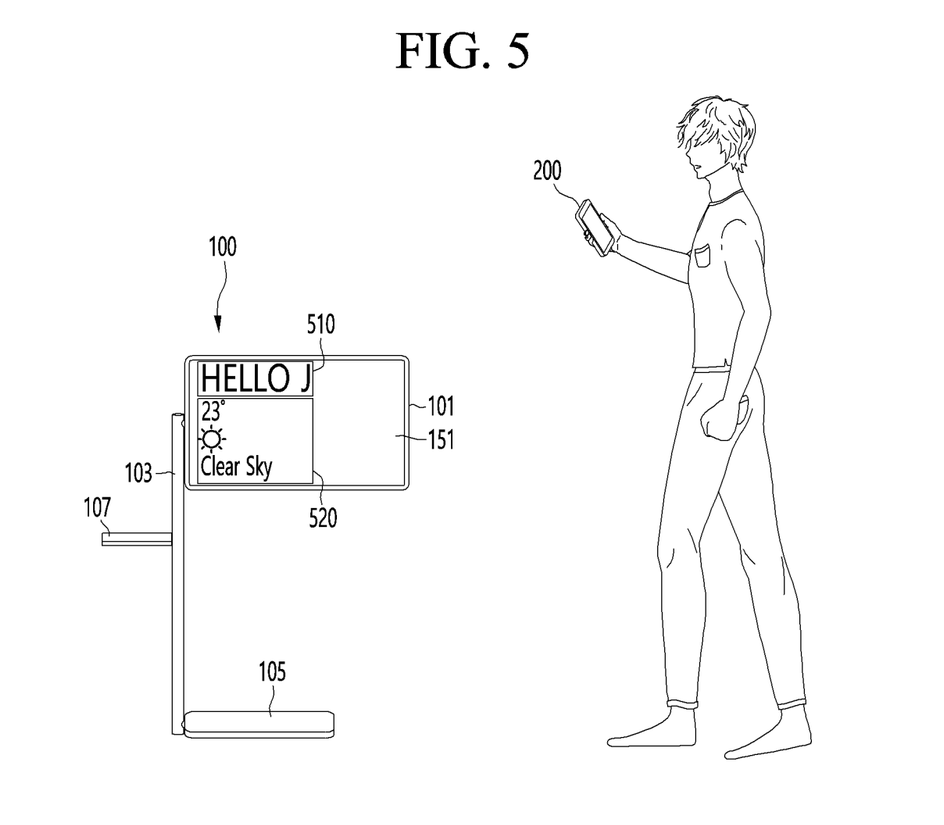
Figure 6:
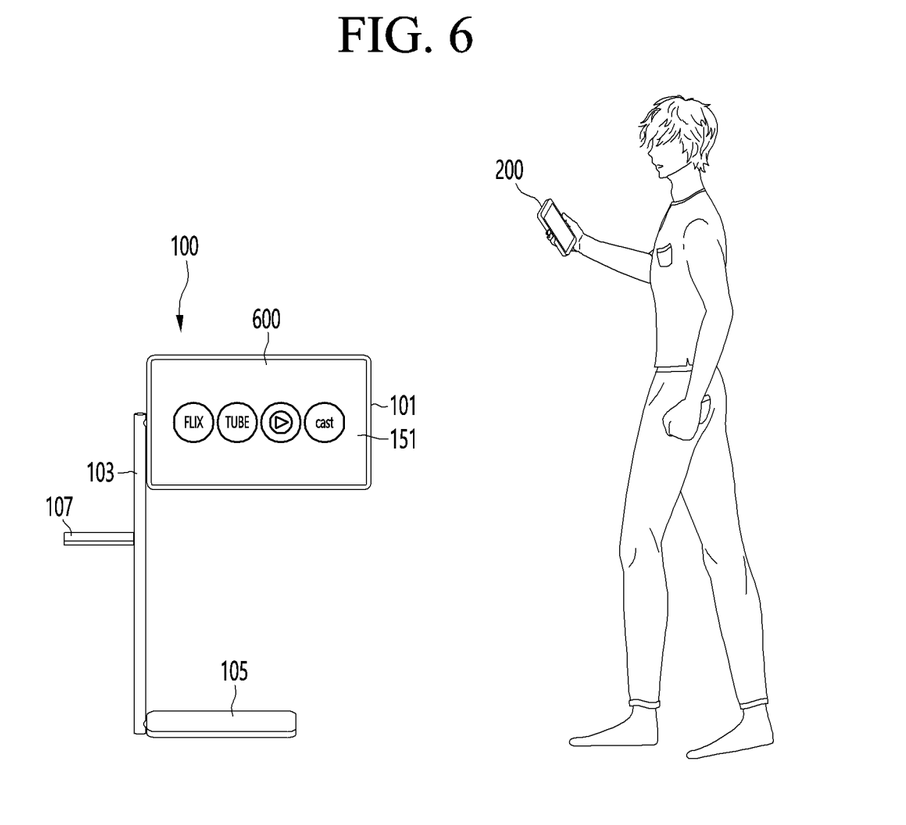

FIGS. 4 to 6 are diagrams illustrating an example of displaying information through automatic interworking with a mobile terminal when a display device detects a proximity of a user, according to an embodiment of the present disclosure.

First, FIG. 4 is described.

The display device 100 may detect whether the user is in proximity through sensing data.

When the display device 100 detects that the user is in proximity to the display device 100, the display device 100 may operate the short-range communication module (circuit) in a sync mode.

Here, it is assumed that the short-range communication module is a Bluetooth module.

When the user's mobile terminal 200 is a device that has been previously connected, the display device 100 may transmit a connection request to the mobile terminal 200 and receive a connection response.

The display device 100 may activate the AOD function of the display 151 in response to reception of the connection response. The display device 100 may recognize that the connection with the mobile terminal 200 has been successfully performed and may activate the AOD function of the display 151.

The display device 100 may request the first type of content from the mobile terminal 200 and receive the first type of content from the mobile terminal 200.

In FIG. 4, the first type of content may be schedule information stored in the mobile terminal 200.

The display device 100 may display the received schedule information 400 on the display 151 to which the AOD function is applied.

As another example, the schedule information 400 may not be information received from the mobile terminal 200, but information stored by the display device 100 itself.

The user can easily check his or her schedule simply by approaching the display device 100.

Next, FIGS. 5 and 6 are described.

In FIG. 5, an example in which the display device 100 displays not information received from the mobile terminal 200 but information generated by the mobile terminal 200 by itself will be described.

That is, the embodiment of FIG. 5 may be an example in which operations S313 to S317 described with reference to FIG. 3 are omitted.

When it is determined that the proximity of the user is detected, based on the sensing data, the display device 100 may display a welcome message 510 welcoming the user's coming home on the display 151 to which the AOD function is applied.

In addition to the welcome message 510, the display device 100 may further display weather information 520 on the display 151.

A user-friendly experience may be provided through the welcome message 510 and the weather information 520.

Next, FIG. 6 is described.

Referring to FIG. 6, the display device 100 may detect the proximity of the user and display information on the display 151 in a state in which the AOD function is activated.

The display device 100 may display, on the display 151, an application screen 600 including a plurality of application icons respectively corresponding to a plurality of applications installed on the display device 100.

Each of the plurality of applications may be an application registered by a user as a favorite.

Each of the plurality of applications may be an application executed by a user on the display device 100 a predetermined number of times or more.

As another example, each of the plurality of applications may be an application executed on the mobile terminal 200a preset number of times or more.

The user may easily access a desired application through the application screen 600.

Figure 7:
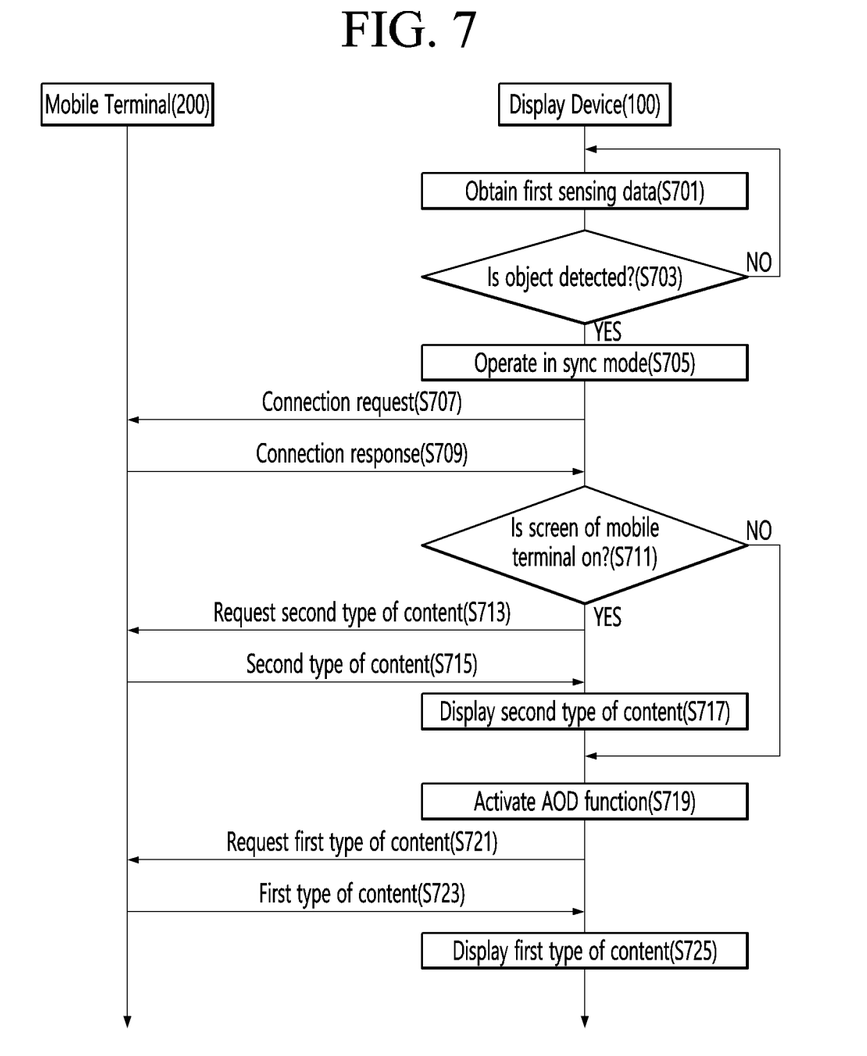
FIG. 7 is a ladder diagram for describing an operating method of a system according to another embodiment of the present disclosure.

FIG. 7 is a ladder diagram for describing an operating method of a system according to another embodiment of the present disclosure.

In the embodiment of FIG. 7, a process of detecting the proximity of the user and performing automatic interworking with the mobile terminal 200 will be described. In addition, in FIG. 7, types of information displayed by the display device 100 may be different according to the screen state of the mobile terminal 200.

The processor 180 of the display device 100 obtains first sensing data (S701).

The detailed description thereof is replaced with the description of operation S301 in FIG. 3.

The processor 180 of the display device 100 determines whether the object is detected, based on the obtained first sensing data (S703).

The detailed description thereof is replaced with the description of operation S303 in FIG. 3.

When it is determined that the proximity of the object is detected, the processor 180 of the display device 100 operates the communication interface 110 in a sync mode (S705).

The detailed description thereof is replaced with the description of operation S305 in FIG. 3.

The processor 180 of the display device 100 transmits a connection request that attempts to connect to the mobile terminal 200 that has been previously connected through the communication interface 110 (S707).

The processor 180 of the display device 100 receives a connection response in response to the connection request through the communication interface 110 (S709).

In an embodiment, the connection response may include information indicating that the display device 100 is allowed to be connected and screen state information of the mobile terminal 200.

The screen state information of the mobile terminal 200 may be information indicating one of an on state and an off state of the screen of the mobile terminal 200.

The processor 180 of the display device 100 determines whether the screen of the mobile terminal 200 is in the on state, based on the connection response (S711).

The processor 180 may parse the connection response, obtain screen state information of the mobile terminal 200, and determine whether the screen of the mobile terminal 200 is in the on state, based on the obtained screen state information.

When it is determined that the screen of the mobile terminal 200 is in the on state, the processor 180 of the display device 100 requests the mobile terminal 200 for a second type of content through the communication interface 110 (S713), and receives the second type of content in response to the request (S715).

The second type of content may be a mirroring image. That is, the second type of content may be a mirroring image corresponding to the image being displayed by the mobile terminal 200.

The processor 180 of the display device 100 displays the received second type of content on the display 151 in the AOD mode (S717).

When it is determined that the screen of the mobile terminal 200 is in the off state, the processor 180 of the display device 100 activates the AOD function of the display 151 (S719).

Then, the processor 180 of the display device 100 requests the mobile terminal 200 for a first type of content through the communication interface 110 (S721), and receives the first type of content in response to the request (S723).

The processor 180 of the display device 100 displays the received first type of content on the display 151 (S725).

The first type of content may be information having a size less than a reference capacity applicable to the AOD function.

The second type of content may be information having a size larger than the reference capacity.

As such, according to an embodiment of the present disclosure, information interworked with the display device 100 is changed according to the screen state of the mobile terminal 200, so that interworking can be performed according to a user's situation.

Figure 8:
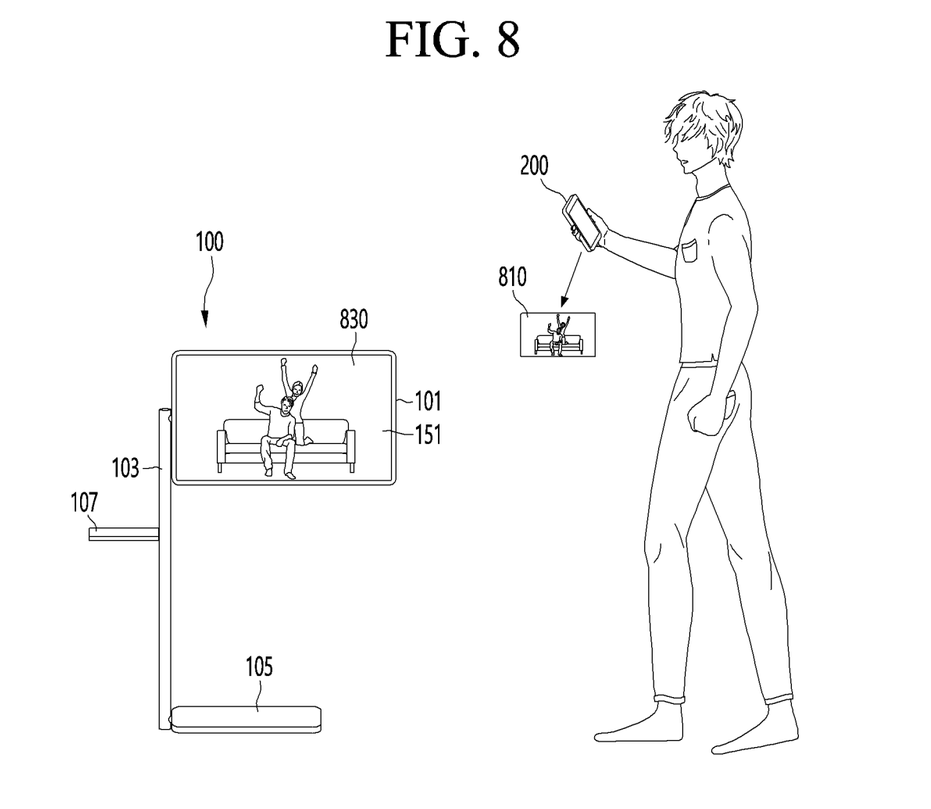
FIGS. 8 and 9 illustrate embodiments describing that information interworked with a display device is changed according to a screen state of a mobile terminal, according to an embodiment of the present disclosure.
Figure 9:
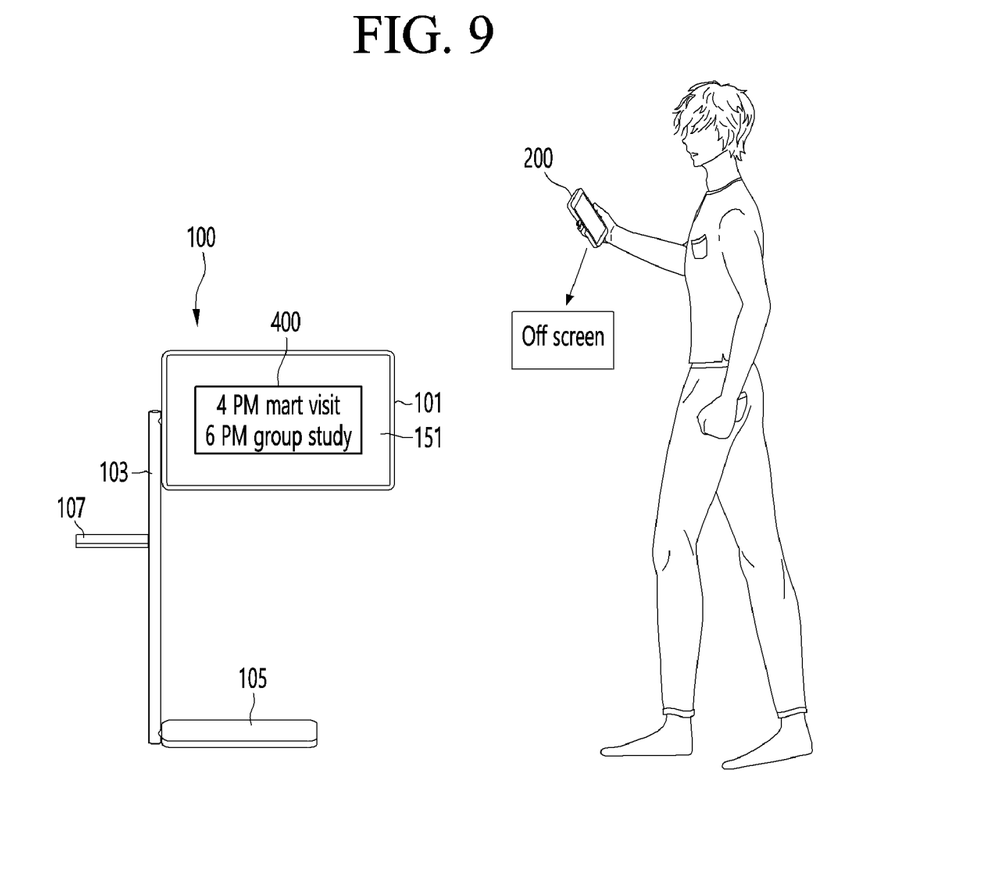

FIGS. 8 and 9 illustrate embodiments describing that information interworked with a display device is changed according to a screen state of a mobile terminal, according to an embodiment of the present disclosure.

In FIG. 8, it is assumed that the mobile terminal 200 is playing video 810, the display device 100 detects the proximity of the user through sensing data, and the connection with the mobile terminal 200 is completed.

When the screen of the mobile terminal 200 is in the on state, the display device 100 may request the second type of content from the mobile terminal 200. The second type of content may be an image 810 being displayed by the mobile terminal 200.

The display device 100 may receive image data corresponding to the image being displayed by the mobile terminal 200 and display the mirroring image 830 on the display 151 based on the received image data.

Therefore, as the user approaches the display device 100, the user may view the video being watched through the mobile terminal 200 on the display device 100 having a larger screen.

Next, FIG. 9 is described.

In FIG. 8, it is assumed that the screen of the mobile terminal 200 is in the off state, the display device 100 detects the proximity of the user through sensing data, and the connection with the mobile terminal 200 is completed.

When it is determined that the screen of the mobile terminal 200 is in the off state, the display device 100 may request a first type of content from the mobile terminal 200. In FIG. 9, the first type of content may be schedule information of the user stored in the mobile terminal 200.

The display device 100 may display, on the display 151, schedule information 400 received from the mobile terminal 200.

Figure 10:
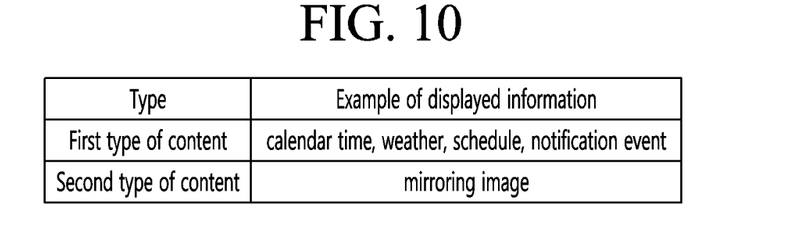
FIG. 10 is a diagram for describing an example of a first type of content and a second type of content described in an embodiment of the present disclosure.

FIG. 10 is a diagram for describing an example of a first type of content and a second type of content described in an embodiment of the present disclosure.

Referring to FIG. 10, the first type of content may be any one of calendar information, current time information, weather information, schedule information, and a notification event indicating a notification received by the mobile terminal 200.

The second type of content may be an image being displayed by the mobile terminal 200. The image being displayed by the mobile terminal 200 may be a still image or a video.

According to another embodiment of the present disclosure, when the mobile terminal 200 is automatically connected to the display device 100 as the proximity of the user is detected, the mobile terminal 200 may set an operation mode to a remote control mode.

As the mobile terminal 200 is set to the remote control mode, the mobile terminal 200 may display buttons for controlling the operation of the display device 100. The buttons may correspond to specific functions of the display device 100, respectively.

According to various embodiments of the present disclosure, the proximity of the user may be more accurately detected, and the display device may easily perform automatic connection with the user's mobile terminal.

According to an embodiment of the present disclosure, the information stored in the mobile terminal automatically connected with the display device may be used through the AOD function, thereby increasing the usability of the AOD function.

According to an embodiment of the present disclosure, information provided according to the user's intention may be interworked by changing the type of information provided according to the screen state of the mobile terminal automatically connected with the display device.

According to an embodiment of the present disclosure, the above-described method can also be embodied as processor-readable codes on a program-recorded medium. Examples of the processor-readable medium may include read-only memory (ROM), random-access memory (RAM), CD-ROM, a magnetic tape, a floppy disk, and an optical data storage device.

The above-described display device is not limited to the configuration and method of the above-described embodiments, and some or all of the embodiments may also be selectively combined and configured to provide various modifications.

What is claimed is:

1. A display device comprising:
   one or more sensors configured to obtain sensing data;
   a display;
   a communication interface configured to perform short-range wireless communication with a mobile terminal; and
   a processor configured to:
      detect proximity of an object based on the obtained sensing data;
      perform automatic connection with the mobile terminal when the proximity of the object is detected; and
      display, on the display, different types of information received from the mobile terminal connected to the display device based on an on state and an off state of a screen of the mobile terminal.

2. The display device according to claim 1, wherein the processor is configured to, when a screen of the mobile terminal is in an off state, request a first type of content from the mobile terminal and display the received first type of content on the display, and
   wherein the first type of content is one of schedule information stored in the mobile terminal and a notification event received by the mobile terminal.

3. The display device according to claim 1, wherein, when a screen of the mobile terminal is in an on state, the processor is configured to request a second type of content from the mobile terminal and display the received second type of content on the display, and
   wherein the second type of content is an image being displayed by the mobile terminal.

4. The display device according to claim 1, wherein the processor is configured to transmit a connection request to the mobile terminal when the proximity of the object is detected, and receive a connection response in response to the connection request, and wherein the connection response comprises screen state information about the mobile terminal.

5. The display device according to claim 1, wherein the one or more sensors comprise a motion sensor configured to obtain motion data and a microphone configured to obtain voice data.

6. The display device according to claim 1, further comprising:
a stand base configured to support the display device;
a back cover configured to cover the outside of the display;
a shaft configured to connect the back cover to the stand base; and
a holder extending from the shaft.

7. The display device according to claim 1, wherein the processor is configured to activate an always on display (AOD) function of displaying the information in a state in which a screen of the display is turned off as the display device is automatically connected with the mobile terminal.

8. The display device according to claim 7, wherein the processor is configured to:
operate the display in a low power mode before the proximity of the object is detected; and
operate the display in an active standby mode after the proximity of the object is detected, and
wherein the display displays no information in the low power mode and the screen of the display is turned off and the AOD function is activated in the active standby mode.

9. The display device according to claim 1, wherein, when the proximity of the object is detected, the processor is configured to operate the communication interface in a sync mode of outputting data received from an external device.

10. The display device according to claim 9, wherein the communication interface comprises a Bluetooth module using a Bluetooth standard.

* * * * *